Figure 1:
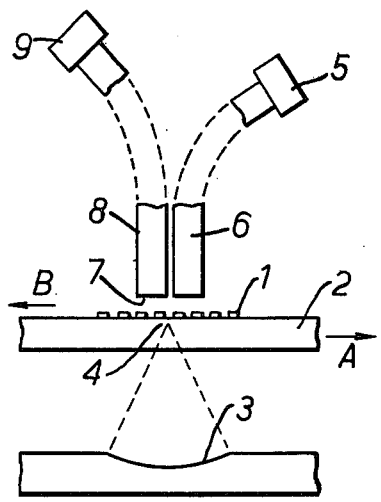

United States Patent [19]

Davies

[11] 4,302,109
[45] Nov. 24, 1981

[54] POSITION ENCODERS

[75] Inventor: George G. Davies, Chelmsford, England

[73] Assignee: The Marconi Company Limited, Chelmsford, England

[21] Appl. No.: 49,903

[22] Filed: Jun. 19, 1979

[51] Int. Cl.³ .................. G01B 11/14; G01B 11/00
[52] U.S. Cl. .......................... 356/375; 250/237 R; 356/395
[58] Field of Search .................... 356/373–375, 356/395; 250/237 G, 237 SE, 237 R

[56] References Cited

U.S. PATENT DOCUMENTS

| 3,524,067 | 8/1970 | West | 250/237 G |
| 3,591,841 | 7/1971 | Heitman et al. | 250/237 G |
| 3,983,391 | 9/1976 | Clemons | 250/237 G |
| 4,097,734 | 6/1978 | Erickson | 250/237 G |
| 4,180,703 | 12/1979 | Cialone et al. | 250/237 G |

FOREIGN PATENT DOCUMENTS 574647 4/1976 Switzerland .................. 250/237 G

*Primary Examiner*—William H. Punter
*Attorney, Agent, or Firm*—Diller, Ramik & Wight

[57] ABSTRACT

An encoder for accurately determining the position of one body relative to another consists of an optical mask carried by one body which moves through the focal point of a concave reflector carried by the other body. The reflector produces an image of the mask in the same plane of the mask and the mask and its image together produce positional information which is utilized by a photo-sensitive detector. The optical pattern of the mask is arranged such that the detector receives constant variations in the levels of illumination as the mask moves.

16 Claims, 6 Drawing Figures

OFF

ON

OFF

ON

OFF

ON

OFF

ON

POSITION ENCODERS

This invention relates to position encoders of the kind which allow the position of one body relative to another body to be determined in a very accurate manner. Known position encoders having a high degree of accuracy are often difficult and expensive to make. The present invention seeks to provide an improved position encoder.

According to this invention a position encoder includes a concave reflector and a movable optical mask which passes at least approximately through a point in front of the concave reflector so that an image of the optical mask is formed close to the optical mask itself, and optical receiving means arranged to receive from the optical mask and the concave reflector light having an intensity which is dependent on the position of the optical mask and its image relative to the centre of the concave reflector, and wherein the optical mask and its image are positioned about a plane aligned with the direction of movement of the optical mask and which plane passes through the centre of the field of view of the optical receiving means and the concave mirror, the optical mask and its image being so arranged that at any point along the direction of movement the optical portion of the mask lies wholly to one side of said plane and its image lies wholly to the other side of said plane.

Preferably, the concave reflector is a part-spherical reflector, the movable optical mask being arranged to pass through its centre of curvature. The optical mask may be arranged to move relative to the concave reflector in a translational or an angular manner. Preferably, the optical mask contains a number of tracks of differing resolution, each track being associated with a different concave reflector and light receiving means.

Preferably again, the light receiving means comprises the end of an optical fibre positioned closely adjacent the optical mask.

Figure 3:
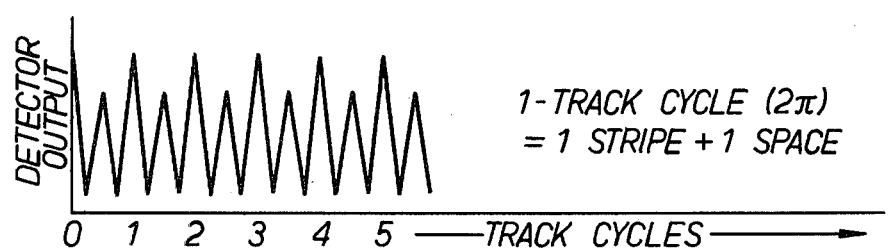
Figure 5:
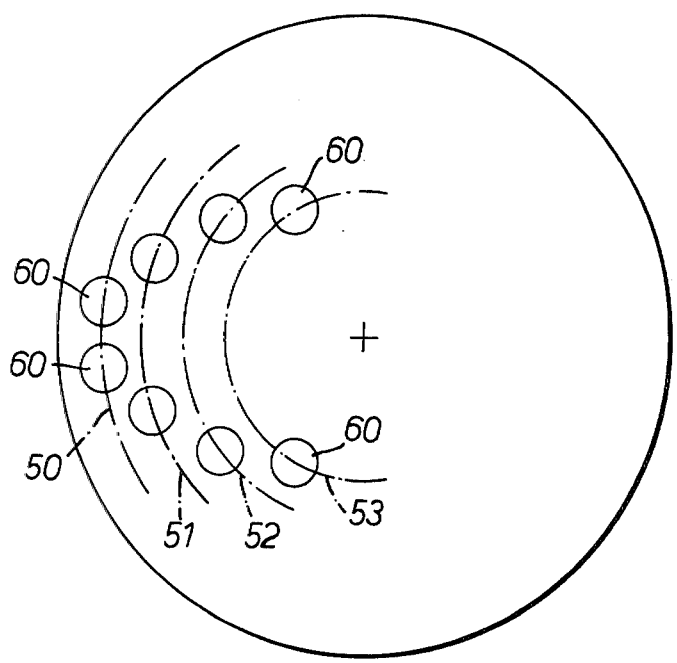
Figure 6:
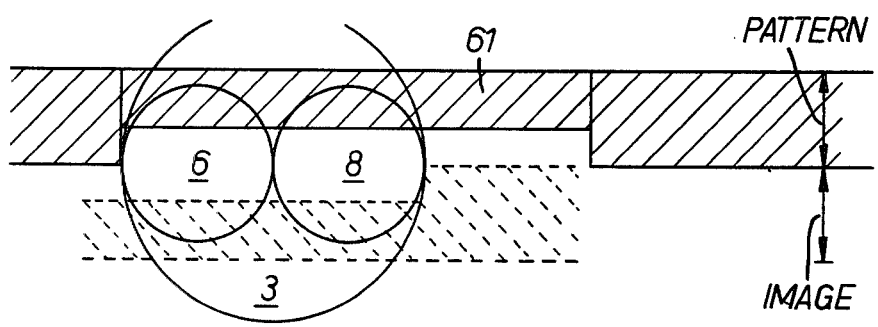

The invention is further described, by way of example, with reference to the accompanying drawings in which, FIG. 1 illustrates in diagrammatic form a position encoder in accordance with the present invention, FIGS. 2a—2d show an example of an optical mask for the purpose of explanation, FIG. 3 shows the output signal obtained by use of the optical mask shown in FIG. 2, FIGS. 4a–4d show an optical mask forming part of the present invention, FIG. 5 shows in diagrammatic form the arrangement of optical masks and reflectors for a position encoder used to indicate angular displacements, and FIG. 6 shows a further, modified optical mask.

Referring to FIG. 1, a movable optical mask 1 carried by the upper surface of a transparent glass plate 2 is positioned so as to pass through the point 4 in front of a part-spherical reflector 3. The point 4 coincides with the centre of curvature of the reflector 3 with allowance being made for the refraction produced by the glass plate 2. The optical mask 1 is illuminated by a light source via an optical fibre 6, and the light reflected by the optical mask 1 and the reflector 3 is received at the end 7 of an optical fibre 8 and passed to a photo-sensitive detector 9.

The reflector 3 produces an inverted focussed image of the optical mask 1 in the same plane as the optical mask itself, but as the optical mask is moved in the direction of, say, the arrow A, its image moves in the opposite direction B.

Figure 2:
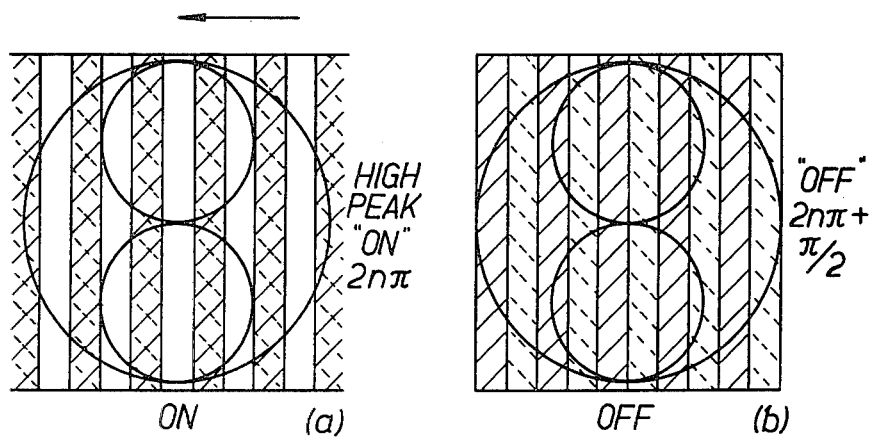
Figure 2:
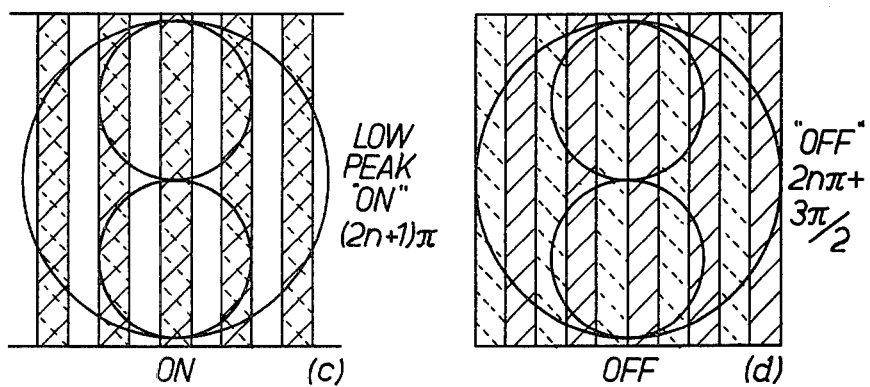
Figure 2:
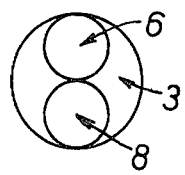
Figure 2:
Figure 4A:
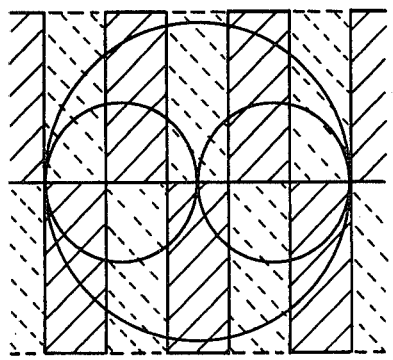
Figure 4B:
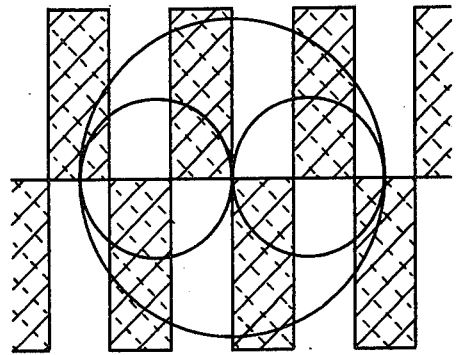
Figure 4C:
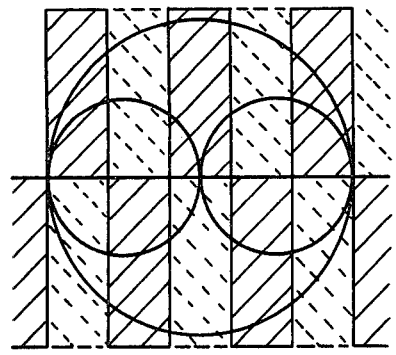
Figure 4C:
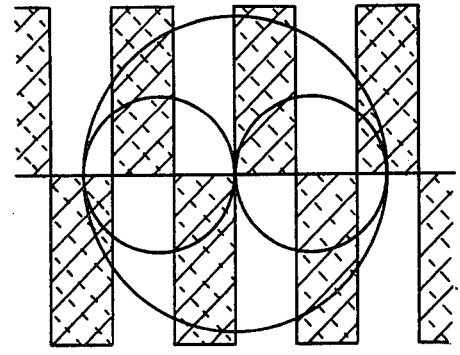

One form of known optical mask is shown in FIG. 2 as a linear track consisting of a pattern of alternate opaque and transparent stripes of equal width. The optical mask consists of alternate stripes of equal width which are opaque and transparent and which run at right angles to the direction of the arrow A, so that as the optical mask and its focussed image move in opposite directions, the gaps in the optical shutter so produced effectively open and close, so modulating the light reflected by the reflector 3 towards the receiving end 7 of the optical fibre 8. This movement of the optical mask 1 relative to the reflector 3 is sensed by the photo-sensitive detector 9 as a series of high and low signals, the amplitude and frequency of which are related to the speed of movement of the optical mask 1 and the thickness of the opaque and transparent stripes in relation to the area of the receiving end 7 of the optical fibre 8. In FIG. 2 the pattern is shown superimposed on the reflector 3 in relation to the transmit and receive optical fibres 6 and 8, and the opaque stripes or mask portions are represented by the continuous cross-hatch lines, whereas the transparent stripes are represented by the blank portions. Since movement of the mask causes the opaque or mask portions to parade through the field of view of the light receiving means in the direction of mask movement whereas the images thereof are paraded through such field of view in the opposite direction, it can be seen that in the positions (b) and (d) the reflected image of the opaque stripes or mask portion aligns precisely with the transparent stripes, so that no light is received via reflector 3, and the photo-sensitive detector 9 provides a low output signal to indicate an OFF condition. Conversely, in positions (a) and (c) the reflected image of the opaque stripes falls on the opaque strips themselves, thereby allowing light reflected by the reflector 3 to be received via the transparent stripes by the optical fibre 8 and passed to the photo-sensitive detector 9, which produces a high output signal to indicate an ON condition. It will be seen that although both positions (a) and (c) provide ON signals, the amount of light falling on the receiving end 7 of the optical fibre is different in the two cases. The amount of light received corresponds to the transparent areas seen by the receiving end 7 and whereas in position (a) light passes through portions of three clear stripes, light passes through portions of only two clear stripes in position (c). The resulting variation of the output signals is shown in FIG. 3.

This variation in amplitude of the ON signal level is dependent on the width of the opaque stripes in relation to the size of the receiving end 7 of the optical fibre 8. It would also be affected if the size of the reflector were very small, but it is assumed here that the diameter of the reflector is at least as great as twice the diameter of the receiving end 7. In FIG. 2, the two optical fibres 6 and 8 are side-by-side relative to the direction of the track pattern, so that both optical fibres are always over the same stripes as each other. This is not essential and they can be arranged to pass over the stripes sequentially—this situation would exist if, in FIG. 2, the track is rotated through 90° relative to the orientation of the fibre ends. In each case as the width of the stripes increases relative to the size of the receiving end 7, the amplitude variation for the peak signal values, as shown in FIG. 3, increases until a limit is reached for the side-by-side orientation when the stripe width equals the diameter of the optical fibre, and for the 'sequential' orientation when the stripe width is equal to twice the diameter of the optical fibre. For the stripe widths less than the limiting values there are two On and two OFF states per track cycle (a track cycle being one opaque stripe plus one transparent stripe). This effect stems from the fact that not only the optical pattern is moved past the optical fibres; the focussed image of the pattern moves in the opposite direction at the same speed. The variation in ON amplitude signal levels shown in FIG. 3 is removed by a position encoder in accordance with the present invention.

In FIG. 4 the opaque or mask portions of the pattern are indicated by the areas cross-hatched in continuous line, and the reflected image is shown cross-hatched in broken line. It will be seen that the pattern no longer consists of simple stripes; the pattern has been split by a line along the diameter of the reflector, and the two divided portions offset by half a track cycle. As before the width of the opaque or mask portions is equal to the width of the transparent portions.

The two ON positions and the two OFF positions are shown in FIG. 4, and it will be seen that the same amount of light passes in ON position (b) as in ON position (d), so that no variations in peak output signal is now obtained for alternate stripe positions. As before, for widths of stripes less than the limiting values specified previously, an output signal having twice the frequency of movement of the stripes past the reflector is obtained.

For the purpose of measuring angular positions the optical mask is advantageously arranged on a transparent glass disc as shown in FIG. 5, each line 50 to 53, represents a separate track, the outer track 50 providing the finest resolution. Each track is associated with two concave reflectors 60, which are formed in the upper surface of a stator block (not shown) which is mounted under the optical mask under the centre of each track. Although, in principle, only a single reflector need be provided for each track, the use of two reflectors in phase quadrature relative to the stripes forming the optical mask allows a given accuracy of position to be achieved with fewer tracks than would be the case with a single reflector per track. Each reflector has its own pair of optical fibres, one to illuminate the optical pattern, and one to receive the reflected light.

For the coarser inner optical patterns in which the width of each of the opaque and transparent portions is greater than twice the diameter of the optical fibres, the form of the pattern can advantageously be as shown in FIG. 6 so that the peak amplitude of the output in an ON condition is the same as for the finer outer tracks in which the widths are less than twice the diameter of the optical fibres. In FIG. 6 links 61 have been introduced into the otherwise transparent spaces such that each link in conjunction with its own image covers just half the area of the transmit and receive optical fibres for the ON condition. The links may be omitted of course if desired, but in this case the peak amplitude will be twice that obtained for the outer tracks.

In any event, it will be appreciated that the mask portions are asymmetrical with respect to the center line passing through the field of view. In FIG. 4, for example, the opaque mask portions in the region above the center line are asymmetrical with respect thereto because each begins at such line and extends upwardly therefrom. In the prior art as shown in FIG. 3, no such asymmetry exists. In FIG. 4, the lower mask portions are also asymmetrical with respect to the center line. This is important because it causes the images of these mask portions to be of opposite asymmetry with respect to the center line. Thus, for a mask portion above the center line, its image always appears at the receiver as extending downwardly from the center line, whereas for mask portions below the center line, their images always appear at the receiver as extending upwardly from the center line. This mask portion image asymmetry reversal, taken in conjunction with the fact that the mask portions parade through the field of view of the receiver in one direction whereas their images parade through in the opposite direction is responsible for attaining the uniformity of peak amplitudes discussed hereinbefore. It should be noted that this mask/image asymmetry reversal is also demonstrated in FIG. 6. In that Figure, each mask portion or stripe is asymmetrical with respect to the center line passing through the field of view in that, as shown, each is above that center line. Each image, however, is below the center line, i.e., its asymmetry is reversed with respect to the stripe which produces it.

The optical masks in the different tracks can be arranged to form an appropriately coded pattern so as to unambiguously indicate the angular position of the disc relative to the stator block. In order to indicate translational positions to a high degree of accuracy a number of parallel straight tracks can be provided so as to be movable over reflectors mounted in a fixed stator block, the tracks ranging from very coarse to very fine resolution. If only relative displacement is required, rather than absolute position, it may be sufficient to provide only a single track having a sufficiently fine resolution corresponding to the degree of accuracy required.

I claim:

1. A position encoder comprising, in combination:
light receiving means for receiving light from a field of view;
an optical mask movable along a path passing through said field of view and said mask having a series of mask portions defining spaces along said path;
illuminating means for illuminating a field of said mask;
reflector means for reflecting light passing through the field illuminated by said illuminating means back through said mask to illuminate said field of view and for imaging mask portions lying in said field illuminated by said illuminating means in said field of view, said reflector means being concave whereby the imaged mask portions parade through said field of view in direction opposite to that which the mask portions are paraded through said field of view due to movement of the mask; and
each of said mask portions being disposed at least predominantly to one side or the other of a line extending along said path and passing through the center of said field of view and through the center of the field illuminated by said illuminating means so as to be asymmetrical with respect to such line whereby the image of each such mask portion produced by said reflecting means is of opposite asymmetry with respect to said line.

2. A position encoder as defined in claim 1 wherein each mask portion lies wholly on one side of said line whereas its image lies wholly on the other side of said line.

3. A position encoder as defined in claim 1 or wherein said mask portions are of the same width as said spaces.

4. A position encoder as defined in claim 1 or 2 wherein said reflector means is part-spherical.

5. A position encoder as defined in claim 3 wherein said reflector means is part-spherical.

6. A position encoder as defined in claim 1 or 2 wherein every other mask portion begins at said line and extends laterally in one direction therefrom whereas the remaining mask portions also begin at said line and extend laterally in the opposite directions therefrom, whereby light intensity maxima received by said light receiving means are of the same amplitude.

7. A position encoder as defined in claim 3 wherein every other mask portion begins at said line and extends laterally in one direction therefrom whereas the remaining mask portions also begin at said line and extend laterally in the opposite directions therefrom, whereby light intensity maxima received by said light receiving means are of the same amplitude.

8. A position encoder as defined in claim 4 wherein every other mask portion begins at said line and extends laterally in one direction therefrom whereas the remaining mask portions also begin at said line and extend laterally in the opposite directions therefrom, whereby light intensity maxima received by said light receiving means are of the same amplitude.

9. A position encoder as defined in claim 5 wherein every other mask portion begins at said line and extends laterally in one direction therefrom whereas the remaining mask portions also begin at said line and extend laterally in the opposite directions therefrom, whereby light intensity maxima received by said light receiving means are of the same amplitude.

10. A position encoder comprising, in combination:
light receiving means for receiving light from a field of view;
an optical mask movable along a path passing through said field of view and said mask having a series of mask portions defining spaces along said path whereby movement of said mask parades said mask portions through said field of view in the direction of mask movement; and
concave reflector means for producing images of said mask portions in said field of view whereby said movement of said mask also parades such images through said field of view but in direction opposite to said movement of the mask;
each of said mask portions being disposed at least predominantly to one side or the other of a line extending along said path and passing through the center of said field of view, so as to be asymmetrical with respect to such line and said reflector means producing an image of each such mask portion which, as compared to the asymmetry of such mask portion with respect to said line, is of opposite asymmetry with respect to said line, and optical fiber means having an illumination field for illuminating said reflector means through said optical mask, said line passing through the center of said illumination field.

11. A position encoder comprising, in combination:
light receiving means for receiving light from a field of view;
an optical mask movable along a path passing through said field of view and said mask having a series of mask portions defining spaces along said path whereby movement of said mask parades said mask portions through said field of view in the direction of mask movement; and
concave reflector means for producing images of said mask portions in said field of view whereby said movement of said mask also parades such images through said field of view but in direction opposite to said movement of the mask;
each of said mask portions being disposed at least predominantly to one side or the other of a line extending along said path and passing through the center of said field of view so as to be asymmetrical with respect to such line, and said reflector means producing an image of each such mask portion which, as compared to the asymmetry of such mask portion with respect to said line, is of opposite asymmetry with respect to said line, each mask portion lies wholly on one side of said line whereas its image lies wholly on the other side of said line, and optical fiber means having an illumination field for illuminating said reflector means through said optical mask, said line passing through the center of said illumination field.

12. A position encoder comprising, in combination:
light receiving means for receiving light from a field of view;
an optical mask movable along a path passing through said field of view and said mask having a series of mask portions defining spaces along said path whereby movement of said mask parades said mask portions through said field of view in the direction of mask movement; and
concave reflector means for producing images of said mask portions in said field of view whereby said movement of said mask also parades such images through said field of view but in direction opposite to said movement of the mask;
each of said mask portions being disposed at least predominantly to one side or the other of a line extending along said path and passing through the center of said field of view so as to be asymmetrical with respect to such line, and said reflector means producing an image of each such mask portion which, as compared to the asymmetry of such mask portion with respect to said line, is of opposite asymmetry with respect to said line, said mask portions are of the same width as said spaces, said reflector means is part-spherical, every other mask portion begins at said line and extends laterally in one direction therefrom whereby the remaining mask portions also begin at said line and extend laterally in the opposite directions therefrom, whereby light intensity maxima received by said light receiving means are of the same amplitude, and said field of view and said illumination field being circular and of essentially the same area and positioned in sequential, touching relation along said path, said reflector means being concave and part-spherical and having a diameter essentially twice that of either one of said fields.

13. A position encoder comprising, combination:
light receiving means for receiving light from a field of view;
an optical mask movable along a path passing through said field of view and said mask having a series of mask portions defining spaces along said path whereby movement of said mask parades said mask portions through said field of view in the direction of mask movement;

and
- concave reflector means for producing images of said mask portions in said field of view whereby said movement of said mask also parades such images through said field of view but in direction opposite to said movement of the mask;
- each of said mask portions being disposed at least predominantly to one side or the other of a line extending along said path and passing through the center of said field of view so as to be asymmetrical with respect to such line, and said reflector means producing an image of each such mask portion which, as compared to the asymmetry of such mask portion with respect to said line, is of opposite asymmetry with respect to said line, each mask portion lies wholly on one side of said line whereas its image lies wholly on the other side of said line, said mask portions are of the same width as said spaces, said reflector means is part-spherical, every other mask portion begins at said line and extends laterally in one direction therefrom whereas the remaining mask portions also begin at said line and extending laterally in the opposite directions therefrom, whereby light intensity maxima received by said light receiving means are of the same amplitude, and said field of view and said illumination field being circular and of essentially the same area and positioned in sequential, touching relation along said path, said reflector means being concave and part-spherical and having a diameter essentially twice that of either one of said fields.

14. A position encoder as defined in claim 10 or 11 wherein said light receiving means comprises an optical fiber.

15. A position encoder as defined in claim 14 wherein said field of view and said illumination field are circular and of essentially the same area and are positioned in sequential, touching relation along said path, said reflector means being concave and part-spherical and having a diameter essentially twice that of either one of said fields.

16. A position encoder as claimed in claim 1 or 2 and wherein a plurality of optical masks are provided, each mask being associated with a different concave reflector means and light receiving means and each mask having mask portions in which the spacing therebetween is different for different masks.

* * * * *